May 28, 1940.    G. E. HANNER    2,202,808
MEAT KEEPER
Filed April 6, 1938    3 Sheets-Sheet 1

WITNESSES:

INVENTOR
GEORGE E. HANNER.
BY
ATTORNEY

May 28, 1940.　　　　G. E. HANNER　　　　2,202,808
MEAT KEEPER
Filed April 6, 1938　　　3 Sheets-Sheet 2

WITNESSES:

INVENTOR
GEORGE E. HANNER.
BY
ATTORNEY

May 28, 1940.  G. E. HANNER  2,202,808
MEAT KEEPER
Filed April 6, 1938  3 Sheets-Sheet 3

WITNESSES:  
INVENTOR  
GEORGE E. HANNER.  
BY  
ATTORNEY

Patented May 28, 1940

2,202,808

UNITED STATES PATENT OFFICE 2,202,808

MEAT KEEPER

George E. Hanner, Springfield, Mass., assignor to Westinghouse Electric & Manufacturing Company, East Pittsburgh, Pa., a corporation of Pennsylvania Application April 6, 1938, Serial No. 200,366

14 Claims. (Cl. 62—1)

This invention relates to meat storage chambers in mechanical refrigerators.

Small cuts of fresh meats which are to be stored for a number of days should be maintained at a temperature slightly above the freezing point of the meat, but should not be permitted to freeze, as freezing may destroy the cellular structure of the meat. Some means should also be provided for preventing dehydration of the meat. Meat storage containers in domestic mechanical refrigerators have been used heretofore, but these containers, in order to keep the meat at the desired temperature and humidity, require that the refrigerator be set to maintain an abnormally low temperature in the main food storage compartment of the refrigerator.

One object of this invention is to provide a mechanical refrigerator with a food storage container so arranged that a low temperature is maintained therein while, at the same time, the main food compartment of the refrigerator is maintained at ordinary and relatively higher refrigerating temperatures.

This and other objects are effected by my invention as will be apparent from the following description and claims taken in connection with the accompanying drawings, forming a part of this application, in which:

The control area of the U-shaped cooling unit defines a freezing compartment and contains the ice trays 14 supported on the bottom of and on the shelves 13.

Figure 1:
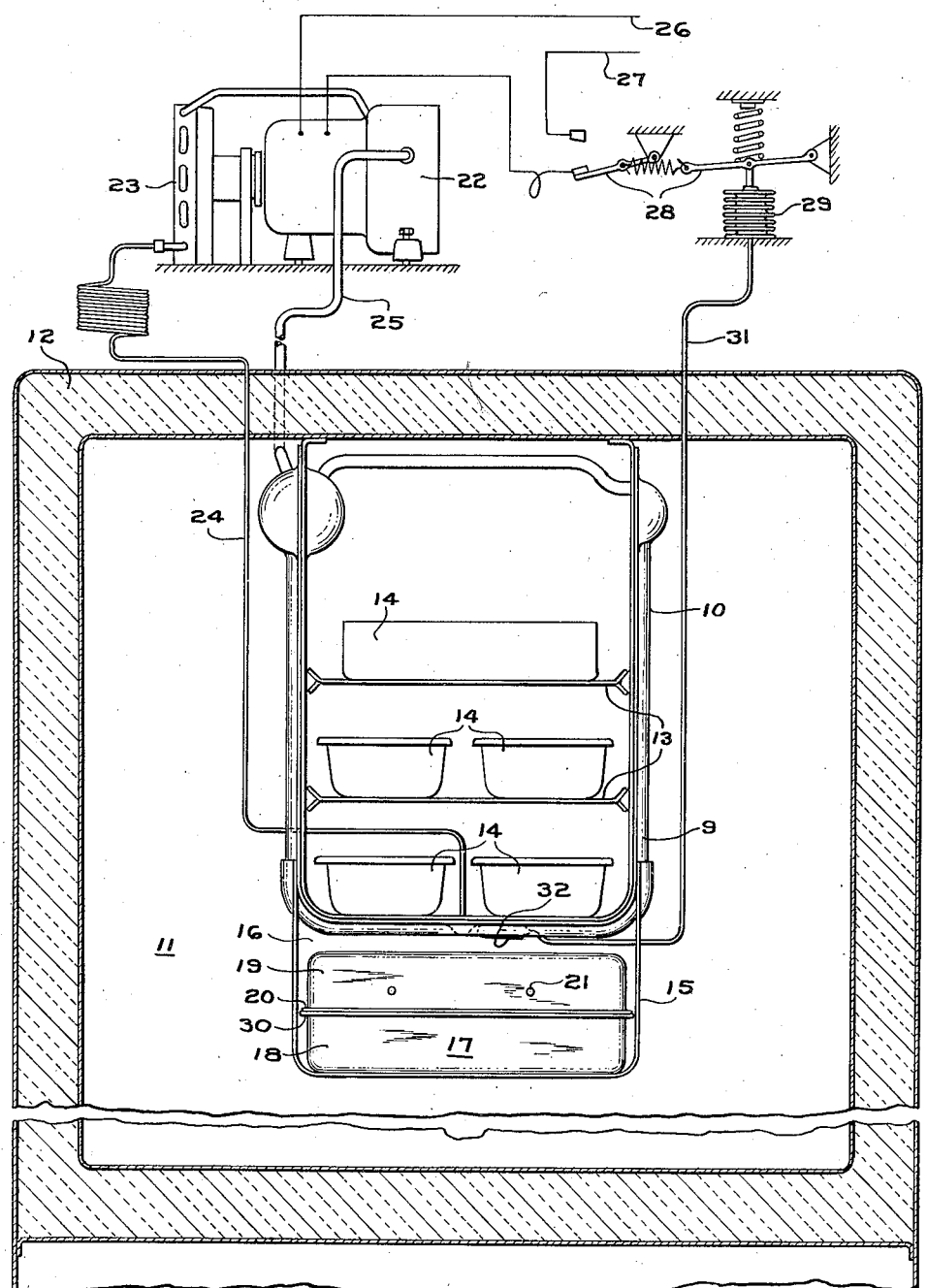
Fig. 1 is an elevation of a domestic refrigerator showing a portion of the main food compartment, the evaporator, meat storage container, and a schematic drawing of the refrigerating apparatus and temperature control associated with the evaporator.

Referring now to Fig. 1, an evaporative cooling unit 10 is secured to the upper wall of the food compartment 11 of the refrigerator cabinet 12. The cooling unit is generally U-shaped and may be of the welded sheet metal type in which refrigerant passages 9 are formed. The details of such an evaporator are shown in the application of William B. Anderson, Serial No. 83,295, filed June 3, 1936.

Figure 4:
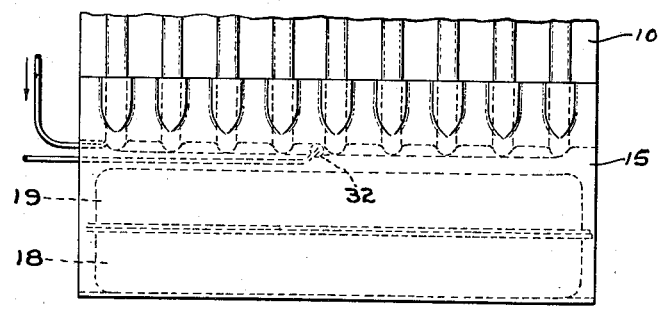

Secured to the lower edges of the sides of the evaporator 10 are the upper edges of a U-shaped metal sheet 15 which, together with the base of the evaporator 10, form a chamber 16 for the insertion of a meat storage container 17. The upper edges of this metal sheet 15 are corrugated to conform to the refrigerant passages 9 in the evaporator 10, as shown in Fig. 4. Removably supported within the chamber 16 is a metallic meat storage container 17 comprising a pan 18 and a cover 19, each of which are provided respectively with cooperating flanges 20 and 30. In the cover 19 may be located ventilating openings 21 for affording a limited circulation of air through the meat container. The meat storage container 17 may be of the type shown in the patent application of Vernon E. Vining, Serial No. 186,954, filed January 26, 1938.

The operating mechanism associated with the evaporator comprises a pumping unit 22, a condenser 23, a capillary impedance tube 24 and a suction tube 25. The compressor unit 22 is actuated by electrical energy from the lines 26 and 27 and is controlled by a snap switch element 28. The snap switch 28 is actuated by a Sylphon bellows 29 connected by a tube 31 to a thermostatic bulb 32 in contact with the base of the evaporator 10. The general characteristics of the control apparatus is to maintain the temperature of the portion of the evaporator in the immediate vicinity of the thermostatic bulb within the limits determined by the characteristics of the snap switch element 28.

It will be observed that the meat storage container 17 extends from the cooling unit 10 into the main food compartment 11 which compartment is maintained at the usual non-freezing food storage temperature. The meat container 17 is cooled by radiation to the evaporator 10 and also by conduction of heat to the evaporator 10 through the metal sheet 15. Because of this heat exchange relationship with the evaporator 10, the meat container 17 is maintained at the desired temperature without the necessity of chilling the entire food compartment 11 of the refrigerator 12 to an abnormally low degree. Furthermore, because the meat is enclosed in the container, dehydration of the meat is prevented. The limited circulation of air through the meat storage container also prevents surface deterioration of the meat.

The thermostatic bulb 32 of the control is secured to approximately the center of the bottom of the evaporator 10, which bottom also forms the top wall of the chamber 16 for the meat storage container 17. The close relationship between the chamber 16 and the thermostatic bulb 32 results in a correspondingly close regulation of the temperature in chamber 16, and permits the use of storage temperatures closer to the freezing point of the meat.

The area of heat-absorbing surface of the evaporator 10 exposed to the chamber 16 and the amount of metal in the chamber walls required to produce the desired temperature in the chamber 16 must be determined by experiment as they depend upon the average temperatures of the cooling unit 10 and the food compartment 11. If there is a tendency for the meat stored in the container 17 to freeze, the area of the heat-absorbing surface of the evaporator 10 which is exposed to radiation from the chamber 16 and/or the amount of heat conducting metal in the walls of the chamber 16 must be reduced. Correspondingly, if the temperature in the meat container 17 is too high, these factors must be increased.

Figure 2:
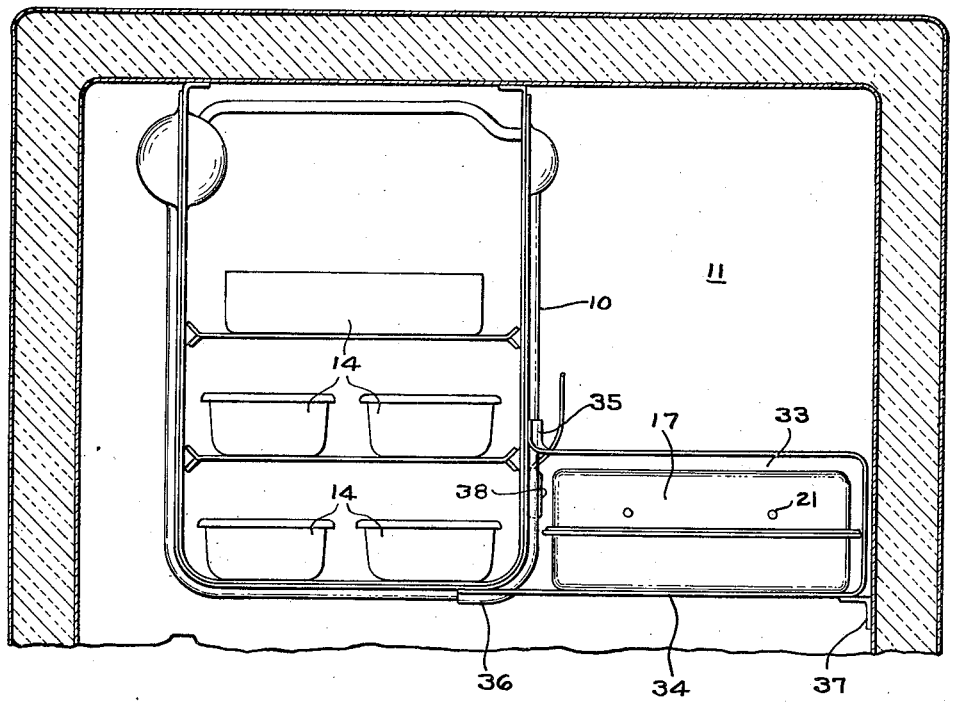
Fig. 2 is a modification showing a different location of the evaporator and meat storage container in the main food compartment shown in Fig. 1.

Fig. 2 shows a modification in the arrangement of the evaporator and the chamber in which the latter is located to one side of the evaporator. The meat container 17, evaporator 10, and ice trays 14 shown in Fig. 2 are identical with the meat container 17, evaporator 10, and ice trays 14 shown in Fig. 1, but the evaporator 10 is moved to the left of its position in the food compartment 11.

A chamber 33 is formed by a metal sheet 34 bent into the form of a U and secured to the evaporator 10. The end portions 35 and 36 of the legs of the U-shaped metal sheet 34 are corrugated to conform to the convolutions of the evaporator unit in the general manner shown in Fig. 4. The end portion 35 of the upper leg is bent outwardly and secured to one side of the evaporator 10 while the end portion 36 of the lower leg is secured to the lower edge of the evaporator 10.

The portion of the U-shaped metal sheet 34 farthest removed from the evaporator 10 is supported on a bracket 37 secured to the side wall of the food compartment 11 of the refrigerator cabinet 12. The thermostatic element 38 is located on the wall of the evaporator 10 exposed to the chamber 33 and the meat storage container 17 is located within the chamber 33.

Figure 3:
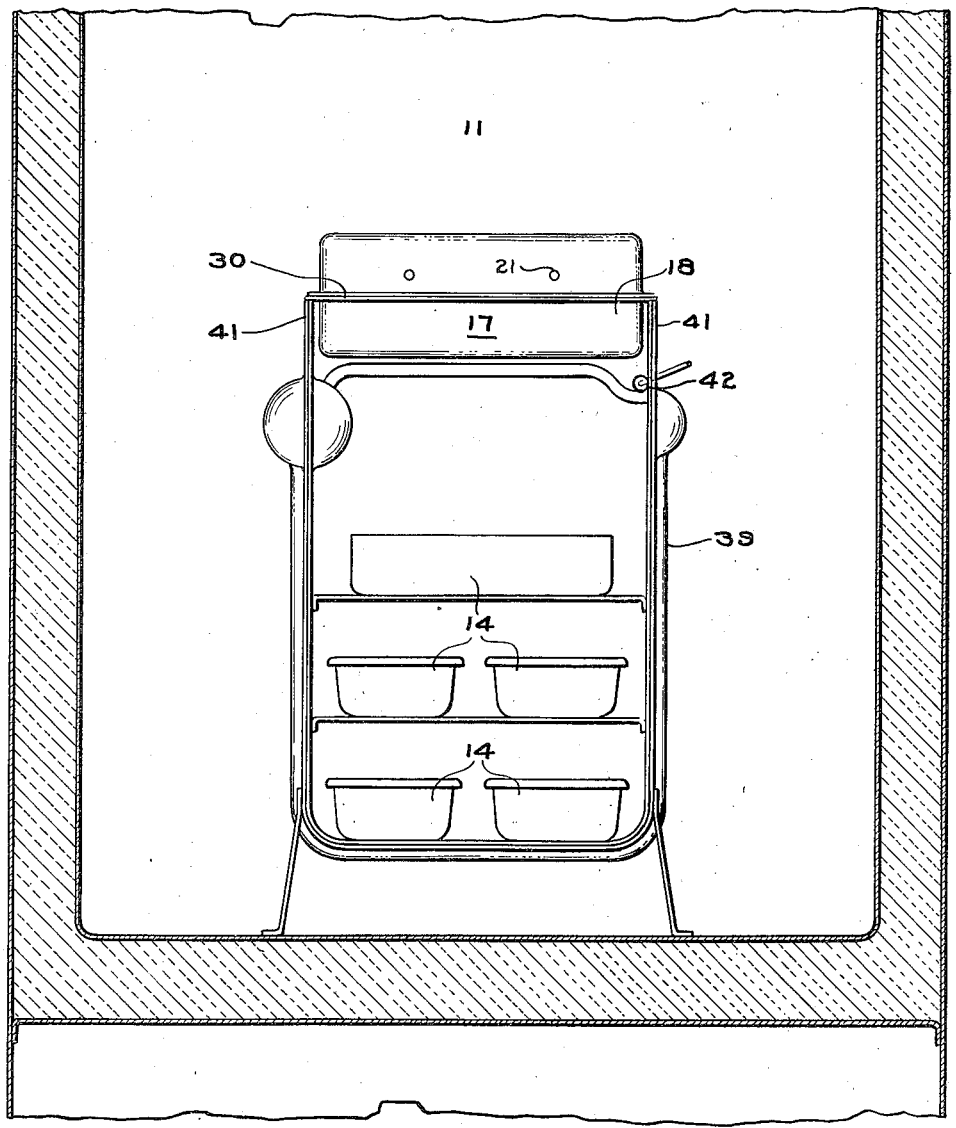
Fig. 3 is a second modification showing a further change in the location of the evaporator and meat storage container in the main food compartment; and, Fig. 4 is a side elevation of a portion of the evaporator and the chamber containing the meat storage container of Fig. 1.

In the modification of the device shown in Fig. 3, the evaporator 39 is secured to the bottom of the food compartment 11. The meat container and the ice trays in this modification are identical with those shown in Fig. 1 and are accordingly provided with the same reference numerals. The upper edges 41 of the evaporator 39 are devoid of refrigerating passages and extend upwardly and engage the flange 30 on the pan 18 of the food container 17 and thereby support the food storage container 17 above the evaporator 39.

The food storage container 17 is cooled by radiation from its base to the evaporator 39 and by conduction of its heat to the upper edge extensions 41 of the evaporator 39.

The thermostatic bulb 42 of the control unit is located on the upper and inner portion of the evaporator 39 and near to the meat storage container 17 to effect a close regulation of the temperature of the meat storage container 17.

From the foregoing it will be apparent that this invention provides a food storage container in a domestic refrigerator which container is maintained at a temperature and humidity suitable for the storage of fresh meat while the main food compartment of the evaporator is maintained at ordinary refrigerating temperatures.

While I have shown my invention in several forms, it will be obvious to those skilled in the art that it is not so limited but is susceptible of various other changes and modifications without departing from the spirit thereof, and I desire, therefore, that only such limitations shall be placed thereupon as are imposed by the prior art or as are specifically set forth in the appended claims.

What I claim is:

1. In a mechanical refrigerator, the combination of a cabinet embodying a main food storage chamber containing air, a metallic cooling unit in said chamber and defining exposed to the air in said chamber and defining a freezing zone and a substantially closed metallic food storage container adjacent to and in metallic heat conducting relationship with said cooling unit, said food storage container projecting from said cooling unit into a portion of said chamber of substantially higher temperature than said freezing zone and said metallic heat conducting relationship being such as to maintain a temperature slightly above freezing in said food storage chamber.

2. In a mechanical refrigerator, in combination, a cabinet, a cooling unit, a food storage container in said cabinet, said food storage container being adjacent said cooling unit and extending therefrom into an area of said cabinet of substantially higher temperature than said cooling unit, a heat conducting means formed substantially of metal connecting said cooling unit and said food storage container, means for supplying a refrigerant to said cooling unit, and an element on said cooling unit adjacent said food storage container for controlling the refrigerant supplying means to maintain the temperature of said food storage container within predetermined limits.

3. Apparatus as defined in claim 2 in which the element on the cooling unit adjacent said food storage container controls the refrigerant supplying means to maintain the temperature of said food storage container at slightly above freezing.

4. Apparatus as defined in claim 2 in which the food storage container is metallic and substantially closed.

5. In a mechanical refrigerator, in combination, a cabinet, a cooling unit therein, a chamber secured directly to said cooling unit, and projecting into an area of said cabinet of substantially higher temperature than said cooling unit, said chamber and said cooling unit having a wall in common and a temperature responsive element on said common wall for controlling the temperature thereof to maintain the temperature of said chamber at slightly above freezing.

6. In a mechanical refrigerator, in combination, a cabinet, a metallic cooling unit therein, a metallic chamber in contact with said cooling unit and projecting into an area of said cabinet of substantially higher temperature than said cooling unit, said chamber and said cooling unit having a wall in common, a temperature sensitive element on said common wall for controlling the temperature thereof, and a food storage container in said chamber.

7. Apparatus according to claim 6 in which the food storage container is metallic and substantially closed.

8. In a mechanical refrigerator, the combination of a cabinet, a cooling unit therein, a substantially U-shaped metallic support secured to the base of the cooling unit, a food storage container in said support, and a thermostatic element secured to the base of the cooling unit to maintain the temperature of said container at slightly above freezing.

9. In a mechanical refrigerator, the combination of a cabinet, a cooling unit therein, a metallic support secured to the side of said cooling unit, a food container in said support, and means for maintaining the cooling unit at such a temperature that the temperature in the food container is slightly above freezing.

10. In a mechanical refrigerator, the combination of a cabinet, a cooling unit therein, a meat storage container supported upon and above said cooling unit, and means for maintaining the cooling unit at such a temperature that the temperature in the food container is slightly above freezing.

11. In a mechanical refrigerator, the combination of a cabinet, a cooling unit therein, upwardly extending metallic supports on said cooling unit, a meat storage container in engagement with said supports and means for maintaining the cooling unit at such a temperature that the temperature in the food container is slightly above freezing.

12. In refrigeration apparatus, the combination of a food storage compartment, an evaporator exposed to the food storage compartment for abstracting heat therefrom, means for supplying refrigerant to the evaporator, said evaporator embodying refrigerant-containing walls and heat-conducting elements without refrigerant therein, said latter elements being disposed in said food storage compartment, and a substantially closed meat storage container in said food storage compartment and exterior of said evaporator, said food storage container being supported by said elements.

13. In a mechanical refrigerator, in combination, a food storage cabinet, a heat absorbing element disposed in the cabinet, said heat absorbing element being normally maintained at a temperature below freezing and being shaped to define a freezing chamber, a food storage container disposed adjacent to said heat absorbing element, said food storage container embodying upper and lower portions forming an enclosed container for food so as to retard dehydration of the latter, said food container having means embodied therein for affording a restricted circulation of air through the container and heat conducting means extending between the heat absorbing element and said food storage container for transmitting heat from the latter to the heat absorbing means, said heat transmitting means being so proportioned and arranged as to normally maintain a temperature in the food storage container which is slightly above freezing temperature and said food container being disposed in a portion of the cabinet outside of the freezing zone defined by said heat absorbing element.

14. The combination set forth in claim 13 wherein the evaporator and the meat storage container are formed of metal.

GEORGE E. HANNER.